United States Patent
Song et al.

(10) Patent No.: US 11,348,572 B2
(45) Date of Patent: May 31, 2022

(54) SPEECH RECOGNITION METHOD AND APPARATUS

(71) Applicants: Samsung Electronics Co., Ltd., Suwon-si (KR); Universite de Montreal, Montreal (CA)

(72) Inventors: Inchul Song, Suwon-si (KR); Junyoung Chung, Gunpo-si (KR); Taesup Kim, Seoul (KR); Sanghyun Yoo, Seoul (KR)

(73) Assignees: Samsung Electronics Co., Ltd., Suwon-si (KR); UNIVERSITE DE MONTREAL, Montreal (CA)

( * ) Notice: Subject to any disclaimer, the term of this patent is extended or adjusted under 35 U.S.C. 154(b) by 328 days.

(21) Appl. No.: 16/038,343

(22) Filed: Jul. 18, 2018

(65) Prior Publication Data

US 2019/0122654 A1    Apr. 25, 2019

Related U.S. Application Data

(60) Provisional application No. 62/575,643, filed on Oct. 23, 2017.

(30) Foreign Application Priority Data

Feb. 14, 2018    (KR) .......................... 10-2018-0018301

(51) Int. Cl.
*G10L 15/16*    (2006.01)
*G10L 15/08*    (2006.01)
(Continued)

(52) U.S. Cl.
CPC ............... *G10L 15/16* (2013.01); *G06N 3/084* (2013.01); *G10L 15/063* (2013.01); *G10L 15/08* (2013.01);
(Continued)

(58) Field of Classification Search
CPC ......... G10L 15/16; G10L 15/02; G10L 15/08; G10L 15/063; G10L 15/083; G10L 15/12;
(Continued)

(56) References Cited

U.S. PATENT DOCUMENTS 5,638,487 A    6/1997  Chigier
7,769,580 B2 *  8/2010  Gemello ................. G10L 15/16
                                                 704/202

(Continued)

FOREIGN PATENT DOCUMENTS

JP    2003-307378 A    10/2003
JP        3576272 B2   10/2004
(Continued)

OTHER PUBLICATIONS

Williams, Ronald J. "Simple Statistical Gradient-Following Algorithms for Connectionist Reinforcement Learning." *Machine Learning*, vol. 8, May 1992 (pp. 229-256).
(Continued)

*Primary Examiner* — Yogeshkumar Patel
(74) *Attorney, Agent, or Firm* — NSIP Law (57) ABSTRACT

A speech recognition method includes obtaining an acoustic sequence divided into a plurality of frames, and determining pronunciations in the acoustic sequence by predicting a duration of a same pronunciation in the acoustic sequence and skipping a pronunciation prediction for a frame corresponding to the duration.

28 Claims, 8 Drawing Sheets

(51) Int. Cl.
*G06N 3/08* (2006.01)
*G10L 15/06* (2013.01)
*G10L 15/187* (2013.01)

(52) U.S. Cl.
CPC ...... *G10L 15/187* (2013.01); *G10L 2015/085* (2013.01)

(58) Field of Classification Search
CPC ....... G10L 15/187; G10L 15/22; G10L 15/30; G10L 17/14; G10L 19/00; G10L 19/167; G10L 19/24; G10L 2015/025; G10L 2015/027; G10L 2015/081; G10L 2015/085; G10L 2015/088; G10L 2015/223; G10L 21/04; G10L 25/21; G10L 25/78; G06N 3/0445; G06N 3/084
USPC ......... 704/202, 231, 232, E15.017, E15.047, 704/E21.017, 258, 266; 375/240.12
See application file for complete search history.

(56) References Cited

U.S. PATENT DOCUMENTS

| | | | |
|---|---|---|---|
| 2006/0111897 | A1 | 5/2006 | Gemello et al. |
| 2007/0192094 | A1 | 8/2007 | Garudadri |
| 2016/0086600 | A1* | 3/2016 | Bauer ............... G10L 15/08 704/202 |
| 2016/0372119 | A1 | 12/2016 | Sak et al. |
| 2017/0206895 | A1 | 7/2017 | Tang |

FOREIGN PATENT DOCUMENTS

| | | |
|---|---|---|
| JP | 2005-77682 A | 3/2005 |
| JP | 2008-15120 A | 1/2008 |
| KR | 10-2004-0082756 A | 9/2004 |
| KR | 10-2007-0061207 A | 6/2007 |
| KR | 10-2011-0035170 A | 4/2011 |
| KR | 10-2017-0041105 A | 4/2017 |

OTHER PUBLICATIONS

Vanhoucke, Vincent et al., "Multiframe Deep Neural Networks for Acoustic Modeling", *Proceedings of the IEEE International Conference on Acoustics, Speech and Signal Processing*, Vancouver, BC, Canada, May 2013 (4 pages in English).

Miao, Yajie, et al. "Simplifying Long Short-Term Memory Acoustic Models for Fast Training and Decoding.", *Proceedings of the IEEE International Conference on Acoustics, Speech and Signal Processing (ICASSP)*, Shanghai, China, Mar. 2016 (5 pages in English).

Yu, Adams Wei et al., "Learning to Skim Text", Cornell University Library arXiv preprint arXiv:1704.06877, Apr. 2017, (11 pages in English).

Zhu, Qifeng, et al., "On the Use of Variable Frame Rate Analysis in Speech Recognition," *2000 IEEE International Conference on Acoustics, Speech, and Signal Processing*, vol. 3, 2000 (pp. 1783-1786).

Lim, Chungsoo, et al., "Efficient implementation techniques of an SVM-based speech/music classifier in SMV," *Multimedia Tools and Applications*, vol. 74, Issue 15, Jul. 2015 (pp. 5375-5400).

Song, Inchul, et al., "Dynamic Frame Skipping for Fast Speech Recognition in Recurrent Neural Network Based Acoustic Models", *2018 IEEE International Conference on Acoustics, Speech and Signal Processing (ICASSP)*, 2018 (pp. 4984-4988).

Extended European Search Report dated Jan. 3, 2019, in counterpart European Patent Application No. 18199047.4 (10 pages in English).

* cited by examiner

| Optimal skipping | 4 | 3 | 2 | 1 | 0 | 1 | 0 | 0 | 1 | 0 | ... |

| Labels | a | a | a | a | a | b | b | c | a | a | ... |

Model skipping: 2, 1, 4, ...

SPEECH RECOGNITION METHOD AND APPARATUS

CROSS-REFERENCE TO RELATED APPLICATIONS

This application claims the benefit under 35 USC 119(e) of U.S. Provisional Application No. 62/575,643 filed on Oct. 23, 2017, in the U.S. Patent and Trademark Office, and the benefit under 35 USC 119(a) of Korean Patent Application No. 10-2018-0018301 filed on Feb. 14, 2018, in the Korean Intellectual Property Office, the entire disclosures of which are incorporated herein by reference for all purposes.

BACKGROUND

1. Field

The following description relates to a speech recognition method and apparatus.

2. Description of Related Art

A speech recognition system includes an acoustic model, a language model, and a decoder. The acoustic model provides information on an association between a speech signal and a pronunciation, and the language model provides information on how frequently specific word sequences occur in the language. The decoder calculates an association between the speech signal and the sentence based on the information provided by the acoustic model and the language model.

The acoustic model may be implemented by a neural network. However, a parallel calculation cannot be readily performed, and a calculation time may thus increase, as a number of frames of a speech signal increases.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a speech recognition method includes obtaining an acoustic sequence divided into a plurality of frames; and determining pronunciations in the acoustic sequence by predicting a duration of a same pronunciation in the acoustic sequence and skipping a pronunciation prediction for a frame corresponding to the duration.

The duration may be represented by a number of frames for which the pronunciation prediction is to be skipped.

The determining of the pronunciations may include predicting a first pronunciation of a first frame among the frames using an acoustic model; predicting a first duration of the first pronunciation using the acoustic model; and skipping a pronunciation prediction for at least one second frame corresponding to the first duration.

The determining of the pronunciations may further include determining a pronunciation of each frame of the at least one second frame to be the first pronunciation.

The determining of the pronunciations may further include predicting a second pronunciation of a frame following a last frame of the at least one second frame and a duration of the second pronunciation.

The acoustic model may include a neural network, an output layer of the neural network may include a label layer and a skip layer, the label layer may be configured to predict a pronunciation of an input frame input to the neural network, and the skip layer may be configured to predict a duration of the pronunciation of the input frame.

The label layer may include a number of nodes equal to a number of all possible pronunciations that can be predicted by the label layer, the duration may be represented by a number of frames for which the pronunciation prediction is to be skipped, and the skip layer may include a number of nodes equal to a number of all possible choices for a number of frames for which the pronunciation prediction is to be skipped.

In another general aspect, a non-transitory computer-readable medium stores instructions that, when executed by a processor, cause the processor to perform the speech recognition method described above.

In another general aspect, a speech recognition method includes obtaining an acoustic sequence divided into a plurality of frames; predicting a first pronunciation of a first frame among the frames using an acoustic model; predicting a first duration of the first pronunciation using the acoustic model; and performing speech recognition on the acoustic sequence by skipping a pronunciation prediction for at least one frame corresponding to the first duration.

The first duration may be represented by a number of frames for which the pronunciation prediction is to be skipped.

The performing of the speech recognition may include determining a pronunciation of each frame of the at least one frame to be the first pronunciation.

The performing of the speech recognition may include predicting a second pronunciation of a frame following a last frame of the at least one frame and a duration of the second pronunciation.

The acoustic model may include a neural network, an output layer of the neural network may include a label layer and a skip layer, the label layer may be configured to predict a pronunciation of an input frame input to the neural network, and the skip layer may be configured to predict a duration of the pronunciation of the input frame.

In another general aspect, a speech recognition apparatus includes a processor configured to obtain an acoustic sequence divided into a plurality of frames, and determine pronunciations in the acoustic sequence by predicting a duration of a same pronunciation in the acoustic sequence and skipping a pronunciation prediction for a frame corresponding to the duration.

The duration may be represented by a number of frames for which the pronunciation prediction is to be skipped.

The processor may be further configured to predict a first pronunciation of a first frame among the frames using an acoustic model, predict a first duration of the first pronunciation using the acoustic model, and skip a pronunciation prediction for at least one second frame corresponding to the first duration.

The processor may be further configured to determine a pronunciation of each frame of the at least one second frame to be the first pronunciation.

The processor may be further configured to predict a second pronunciation of a frame following a last frame of the at least one second frame and a duration of the second pronunciation.

The acoustic model may include a neural network, an output layer of the neural network may include a label layer and a skip layer, the label layer may be configured to predict a pronunciation of an input frame input to the neural network, and the skip layer may be configured to predict a duration of the pronunciation of the input frame.

The label layer may include a number of nodes equal to a number of all possible pronunciations that can be predicted by the label layer, the duration may be represented by a number of frames for which the pronunciation prediction is to be skipped, and the skip layer may include a number of nodes equal to a number of all possible choices for a number of frames for which the pronunciation prediction is to be skipped.

In another general aspect, a speech recognition method includes receiving an acoustic sequence; predicting a first pronunciation at a first point in the acoustic sequence; predicting a second point in the acoustic sequence at which the first pronunciation is expected to change; and skipping a pronunciation prediction until the second point is reached.

The predicting of the second point may include predicting a first duration during which the first pronunciation is expected to continue after the first point, and the skipping of the pronunciation prediction may include skipping the pronunciation prediction for the first duration.

The predicting of the first pronunciation may include predicting the first pronunciation using an acoustic model, and the predicting of the first duration may include predicting the first duration using the acoustic model.

The acoustic model may include a neural network configured to receive the acoustic sequence, the neural network may include an output layer, the output layer may include a label layer and a skip layer, the label layer may be configured to predict a pronunciation at a point in the acoustic sequence, and the skip layer may be configured to predict a duration of the pronunciation predicted at the point in the acoustic sequence.

The label layer may include a number of nodes equal to a number of all possible pronunciations that can be predicted by the label layer, and the skip layer may include a number of nodes equal to a number of all possible durations that can be predicted by the skip layer.

The label layer may be a softmax layer, a pronunciation corresponding to a node of the label layer having a greatest output value among the nodes of the label layer may correspond to the predicted pronunciation at the point in the acoustic sequence, the skip layer may be a softmax layer, and a pronunciation corresponding to a node of the skip layer having a greatest output value among the nodes of the skip layer may correspond to the predicted duration of the predicted pronunciation at the point in the acoustic sequence.

The acoustic sequence may be divided into frames, the predicting of the first pronunciation may include predicting the first pronunciation for a first frame in the acoustic sequence, the predicting of the second point may include predicting a number of second frames in the acoustic sequence for which the first pronunciation will continue after the first frame, and the skipping of the pronunciation prediction may include skipping the pronunciation prediction for the number of second frames.

The speech recognition method further include assigning the first pronunciation to each of the second frames; predicting a second pronunciation for the third frame; and predicting a number of fourth frames in the acoustic sequence for which the second pronunciation will continue after the third frame.

The number of second frames may be greater than or equal to 0, and less than or equal to a maximum permissible number of frames for which the pronunciation prediction can be skipped.

The maximum permissible number of frames for which the pronunciation prediction can be skipped may be set based on a desired tradeoff between an accuracy of speech recognition and a speed of speech recognition.

Increasing the maximum permissible number of frames for which the pronunciation prediction can be skipped may decrease the accuracy of speech recognition and increase the speed of speech recognition, and decreasing the maximum permissible number of frames for which the pronunciation prediction can be skipped may increase the accuracy of speech recognition and decrease the speed of speech recognition.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, expressions, for example, "between" and "immediately between," and "adjacent to" and "immediately adjacent to" may also be construed as described in the foregoing.

As used herein, the term "and/or" includes any one and any combination of any two or more of the associated listed items.

Unless otherwise defined, all terms, including technical and scientific terms, used herein have the same meaning as commonly understood by one of ordinary skill in the art to which the disclosure of this application pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Examples described herein may be embodied in various types of products, for example, a personal computer (PC), a laptop computer, a tablet PC, a smartphone, a television (TV), a smart home appliance, an intelligent vehicle, a kiosk, and a wearable device. The examples may be applied to user verification or authentication used in, for example, a smartphone, a mobile device, and a smart home system. The examples may also be applied to payment services to be provided through user verification or authentication. Further, the examples may also be applied to an intelligent vehicle system that automatically starts a vehicle through user verification or authentication.

Figure 1:
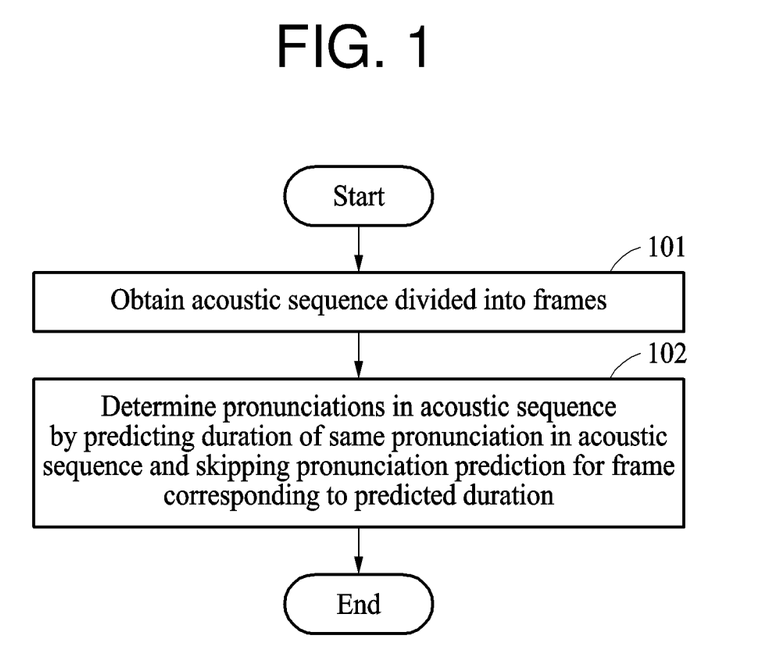
FIG. 1 is a flowchart illustrating an example of a speech recognition method.

FIG. 1 is a flowchart illustrating an example of a speech recognition method. The speech recognition method described hereinafter may be performed by a speech recognition apparatus described herein.

Referring to FIG. 1, in operation 101, the speech recognition apparatus obtains an acoustic sequence divided into a plurality of frames. The speech recognition apparatus is a hardware apparatus configured to process information required to perform speech recognition. The speech recognition apparatus performs operations and calculations and processes instructions that are related to speech recognition.

The speech recognition apparatus may be provided in various computing apparatuses and/or systems, some examples of which include a smartphone, a tablet PC, a laptop computer, a desktop computer, a TV, a wearable device, a security system, and a smart home system. The speech recognition apparatus may load information associated with an acoustic model from a database provided in advance. The database may be embodied as a memory included in the speech recognition apparatus or an external device, such as a server connected to the speech recognition apparatus through a network or wired or wireless communications.

In one example, the speech recognition apparatus obtains an acoustic sequence. The speech recognition apparatus divides the obtained acoustic sequence into a plurality of frames. The acoustic sequence is a speech signal including speech information and is divided into frames. In one example, a one second (sec) acoustic sequence is divided into 100 frames each including 10 milliseconds (msec) of speech information.

In operation 102, the speech recognition apparatus predicts a duration of a same pronunciation in the acoustic sequence, and determines pronunciations in the acoustic sequence by skipping a pronunciation prediction for a frame corresponding to the predicted duration. The duration of the same pronunciation may be represented by the number of frames for which the pronunciation prediction is to be skipped.

The speech recognition apparatus performs speech recognition by dynamically skipping at least a portion of the acoustic sequence. The speech recognition apparatus predicts a pronunciation of a frame included in the acoustic sequence, predicts a duration of the pronunciation, and skips a subsequent frame corresponding to the predicted duration of the pronunciation. Thus, contrary to a static skipping method in which a preset number of frames is skipped, the speech recognition method described herein dynamically determines the number of frames to be skipped based on a pronunciation.

The speech recognition apparatus uses an acoustic model to process a speech signal. The acoustic model is embodied by a neural network. Examples of the neural network include a deep neural network (DNN), a recurrent neural network (RNN), and a recurrent DNN (RDNN). The speech recognition apparatus uses an acoustic model trained in advance to dynamically skip a time step that is considered relatively less important when predicting the pronunciations corresponding to the acoustic sequence. For example, using the acoustic model embodied by an RNN, the speech recognition apparatus predicts a target for which a pronunciation prediction is to be skipped, and predicts the pronunciations corresponding to the acoustic sequence. In this example, the RNN is trained to predict a pronunciation and skip a pronunciation prediction. The RNN includes a network for a pronunciation prediction and a network for a skipping prediction, and the networks share information in the speech signal corresponding to the acoustic sequence.

In one example, when processing the acoustic sequence, the speech recognition apparatus dynamically adjusts a size of a portion of the acoustic sequence to be skipped to minimize an information loss and a processing time. For example, when processing sequential data such as text and speech, the speech recognition apparatus increases a processing speed of speech recognition by decreasing a number of read operations needed to process information, increases a response speed of speech recognition by reducing an amount of information in the acoustic sequence to be processed, and reduces a server cost by increasing a concurrent connection throughput of a server for speech recognition.

Hereinafter, a speech recognition method will be described with reference to FIGS. 2 through 4, and a training method for speech recognition will be described with reference to FIGS. 5 and 6. In addition, a system and an apparatus will be described with reference to FIGS. 7 and 8.

Figure 2:
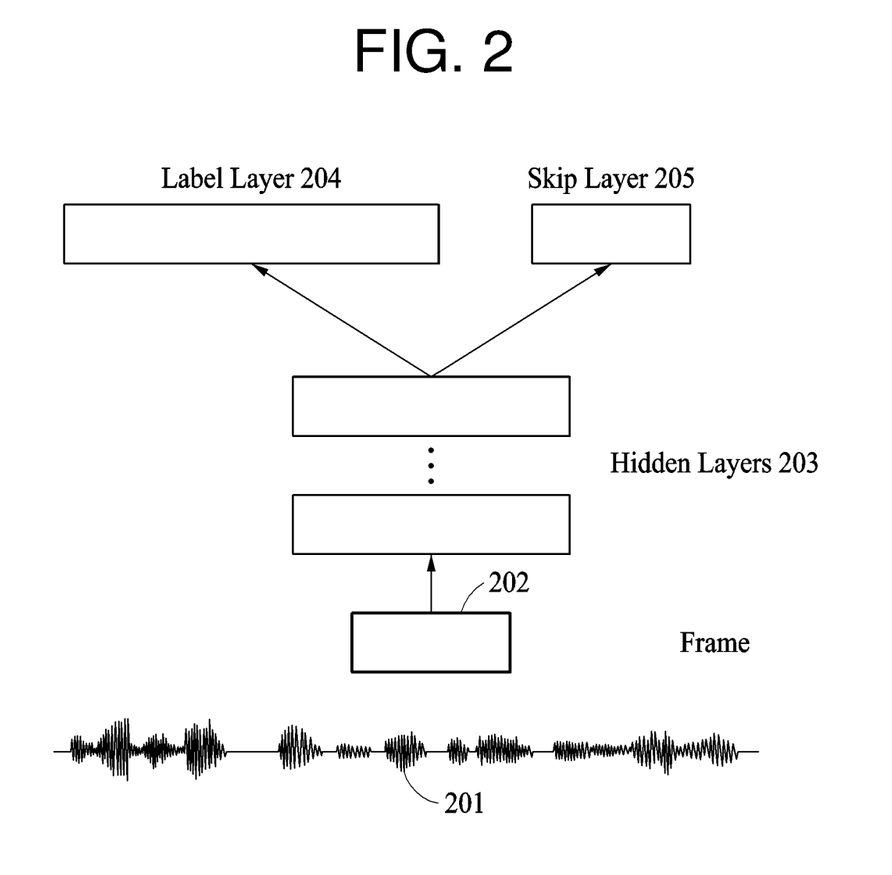
FIG. 2 is a diagram illustrating another example of a speech recognition method.

FIG. 2 is a diagram illustrating another example of a speech recognition method. The speech recognition method described hereinafter may be performed by a speech recognition apparatus described herein.

The speech recognition apparatus performs speech recognition using an acoustic model embodied by a DNN, an RNN, or an RDNN. In a general architecture of a neural network, an input and an output are independent of each other. However, the RNN has an architecture in which previous outputs affect a result of calculating or computing a new output.

Referring to FIG. 2, the speech recognition apparatus divides an acoustic sequence 201 into a plurality of frames, and predicts at least one pronunciation of the frames and a duration of the pronunciation. The speech recognition apparatus performs speech recognition using an acoustic model, which includes an input layer (not shown), a plurality of hidden layers 203, and an output layer. The output layer of the acoustic model includes a label layer 204 and a skip layer 205. The label layer 204 is a layer used to predict a pronunciation of an input frame 202, and the skip layer 205 is a layer used to predict a duration of the pronunciation of the input frame 202. The label layer 204 and the skip layer 205 each may be a softmax layer.

The label layer 204 includes a number of nodes that is equal to a number of all possible pronunciations. Each of the nodes of the label layer 204 indicates a probability of the input frame 202 having a certain pronunciation. The skip layer 205 includes a number of nodes that is equal to a number of all possible choices for a number of frames for which pronunciation prediction is to be skipped. For example, a first node of the skip layer 205 indicates a probability of not skipping a frame, i.e., a probability of skipping 0 frames, a second node of the skip layer 205 indicates a probability of skipping one frame, a third node of the skip layer 205 indicates a probability of skipping two frames, and an n-th node of the skip layer 205 indicates a probability of skipping n−1 frames. That is, there are n choices of 0 to n−1 frames that are to be skipped, so the skip layer 205 includes n node respectively corresponding to these n choices.

The maximum permissible number of frames for which the pronunciation prediction can be skipped is set based on a desired tradeoff between an accuracy of speech recognition and a speed of speech recognition. Increasing the maximum permissible number of frames for which the pronunciation prediction can be skipped decreases the accuracy of speech recognition and increases the speed of speech recognition, and decreasing the maximum permissible number of frames for which the pronunciation prediction can be skipped increases the accuracy of speech recognition and decreases the speed of speech recognition.

Figure 3:
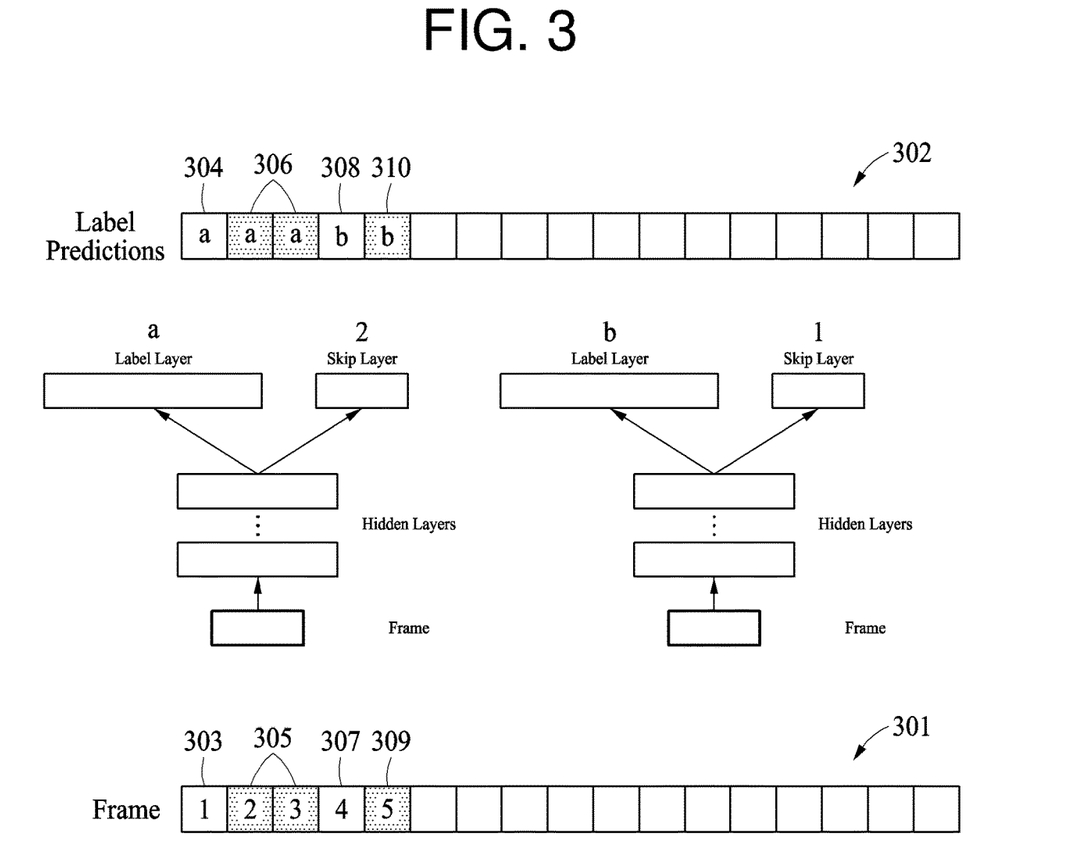
FIG. 3 is a diagram illustrating another example of a speech recognition method.

FIG. 3 is a diagram illustrating another example of a speech recognition method. The speech recognition method described hereinafter may be performed by a speech recognition apparatus described herein.

The speech recognition apparatus predicts a pronunciation of a given frame using an acoustic model, and simultaneously predicts a number of frames following the given frame to be skipped. The speech recognition apparatus then applies, to a pronunciation probability of a frame to be skipped, a pronunciation probability of a current frame. For example, when a given frame is a first frame and five frames are determined to be skipped, the speech recognition apparatus skips five frames following the first frame, that is, second through sixth frames, without processing the five frames. The speech recognition apparatus then predicts a pronunciation of a seventh frame following the sixth frame and also predicts a number of frames following the seventh frame to be skipped. The speech recognition apparatus repeats this process until there is no frame left to be processed.

Referring to FIG. 3, the speech recognition apparatus generates a plurality of labels 302 respectively corresponding to a plurality of frames 301. A label corresponds to a pronunciation. The speech recognition apparatus predicts that a pronunciation 304 of a first frame 303 is "a" and the number of frames to be skipped is two. For example, a probability value corresponding to "a," the pronunciation 304, is a maximum value among probability values output from nodes of a label layer of an acoustic model, and a probability value corresponding to 2, the number of the frames to be skipped, is a maximum value among probability values output from nodes of a skip layer of the acoustic model. The speech recognition apparatus determines a pronunciation 306 of second and third frames 305 to be "a" without processing the second and third frames 305. The speech recognition apparatus then processes a fourth frame 307, and predicts that a pronunciation 308 of the fourth frame 307 is "b" and the number of frames to be skipped is one. The speech recognition apparatus determines a pronunciation 310 of a fifth frame 309 to be "b" without processing the fifth frame 309, and repeats this process until all of the plurality of frames 301 have been processed.

Figure 4:
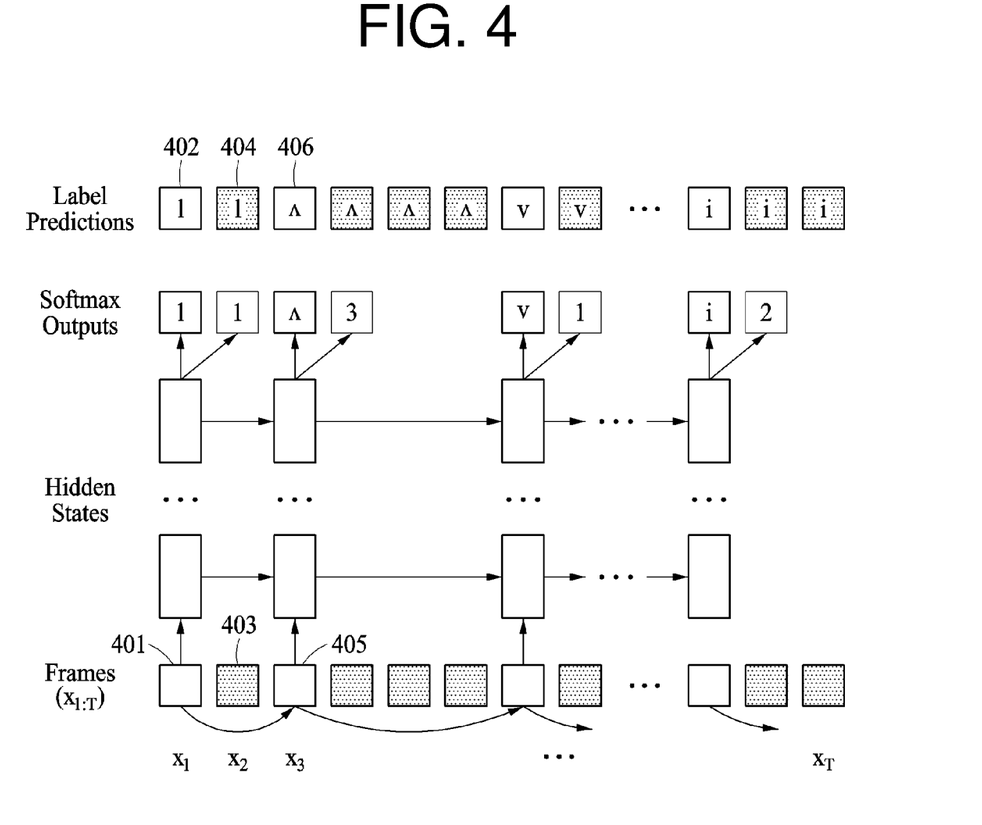
FIG. 4 is a diagram illustrating another example of a speech recognition method.

FIG. 4 is a diagram illustrating another example of a speech recognition method. The speech recognition method described hereinafter may be performed by a speech recognition apparatus described herein.

In this example, an acoustic model is embodied by an RNN, and includes a hidden layer corresponding to hidden states and an output layer that generates two outputs. Last hidden states are used to calculate probability values that are generated by a label layer and a skip layer, which are softmax layers.

Referring to FIG. 4, when an acoustic sequence divided into T frames $x_{1:T}$ including a first frame $x_1$ 401 through a T-th frame $x_T$ is obtained, the speech recognition apparatus calculates hidden states by processing the first frame $x_1$ 401. The label layer generates a probability value corresponding to a pronunciation and the skip layer generates a probability value corresponding to the number of frames to be skipped based on the hidden states, and the speech recognition apparatus predicts a pronunciation 402 of the first frame $x_1$ 401 and the number of frames (1) to be skipped. The speech recognition apparatus copies an output of the label layer based on an output of the skip layer to determine a pronunciation 404 of a second frame $x_2$ 403. The speech recognition apparatus predicts a pronunciation 406 of a third frame $x_3$ 405 and the number of frames (3) to be skipped. The speech recognition apparatus repeats this process described in the foregoing until the last frame $x_T$ has been processed.

Figure 5:
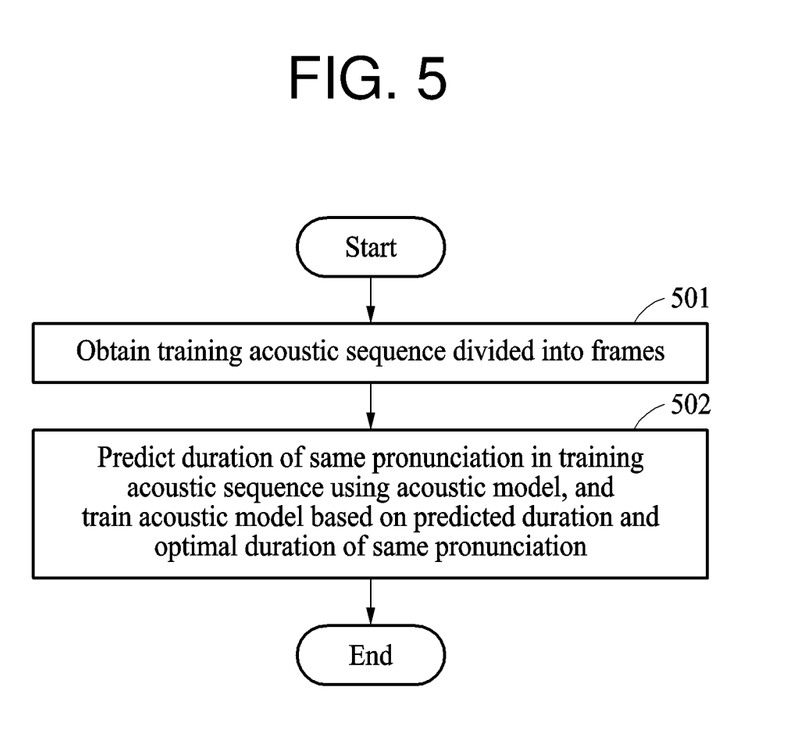
FIG. 5 is a flowchart illustrating an example of a training method for speech recognition.

FIG. 5 is a flowchart illustrating an example of a training method for speech recognition. The training method described hereinafter may be performed by a training apparatus for speech recognition described herein.

Referring to FIG. 5, in operation 501, the training apparatus for speech recognition obtains a training acoustic sequence divided into a plurality of training frames. The training apparatus is a hardware apparatus configured to perform training for the speech recognition. The training apparatus performs operations and calculations and processes instructions associated with the training. Examples of hardware used to implement the speech recognition apparatus described herein may also be used to implement the training apparatus.

In operation 502, the training apparatus predicts a duration of a same pronunciation in the training acoustic sequence using an acoustic model, and trains the acoustic model based on the predicted duration and an optimal duration of the same pronunciation. The training apparatus generates a reward based on the predicted duration and the optimal duration, and trains the acoustic model based on the generated reward.

In one example, the training apparatus predicts a duration corresponding to a training frame. The training apparatus generates a reward corresponding to the training frame based on the predicted duration corresponding to the training frame and an optimal duration corresponding to the training frame. The training apparatus generates the reward corresponding to the training frame by determining whether the predicted duration is equal to the optimal duration and applying a weight to a difference between the two durations. A weight to be applied when the predicted duration is greater than the optimal duration and a weight to be applied when the predicted duration is less than the optimal duration are set differently. The reward is generated using a reward function.

In one example, the training apparatus uses objective function corresponding to a parameter that enables the acoustic model to predict a duration of a same pronunciation. The training apparatus optimizes the parameter to predict the duration by applying a generated reward to the objective function. In addition, the training apparatus uses an objective function corresponding to a parameter that allows the acoustic model to predict a pronunciation. The training apparatus optimizes the parameter to predict the duration and the parameter to predict the pronunciation by applying the reward to the objective function corresponding to the parameter to predict the duration and to the objective function corresponding to the parameter to predict the pronunciation. An example of the training method will be described with reference to FIG. 6.

Figure 6:
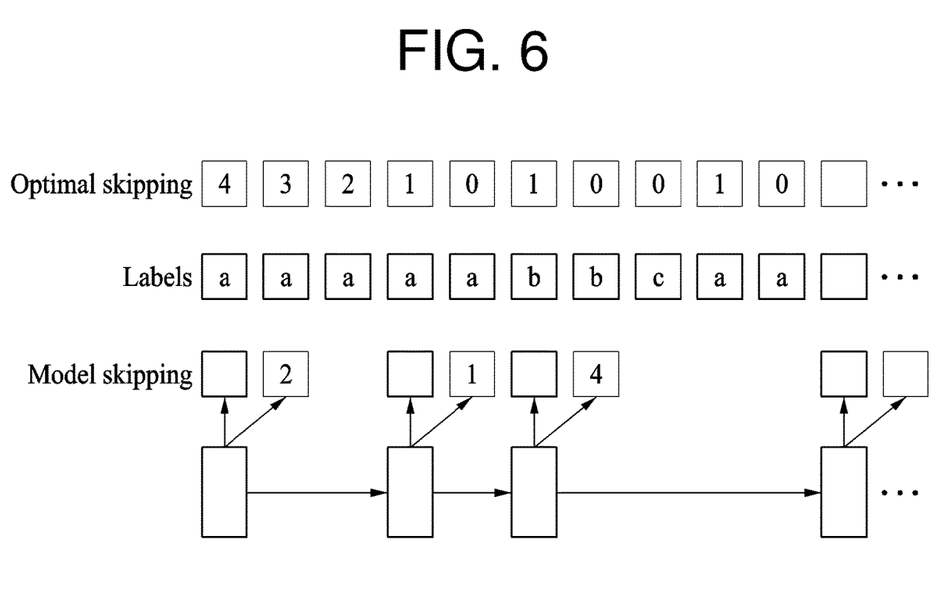
FIG. 6 is a diagram illustrating another example of a training method for speech recognition.

FIG. 6 is a diagram illustrating another example of a training method for speech recognition.

Referring to FIG. 6, the training apparatus predicts that a first pronunciation of a training frame is "a" and a duration of the pronunciation "a" is 2. The duration of 2 denotes the number of frames for which a pronunciation prediction is to be skipped, hereinafter simply referred to as the number of skip frames. In the example illustrated in FIG. 6, optimal durations 4, 3, 2, 1, 0, 1, 0, 0, 1, 0, . . . and labels "a," "a," "a," "a," "a," "b," "b," "c," "a," "a," . . . are ground truth values corresponding to training frames. In this example, 2, 1, 4, . . . are durations predicted by an acoustic model.

In this example, the training apparatus generates a reward corresponding to the training frame based on the duration 2 predicted from the training frame by the acoustic model and the optimal duration 4 corresponding to the training frame. As described above, the training apparatus optimizes a parameter of the acoustic model by applying the reward to an objective function.

In one example, the acoustic model is defined by a parameter $\theta_l$ used to predict a pronunciation and a parameter $\theta_s$ used to predict the number of skip frames. The training apparatus optimizes the parameters $\theta_l$ and $\theta_s$ to train the acoustic model. The training apparatus defines a cross entropy objective function $J_1(\theta_1)$ for the parameter $\theta_l$. The objective function $J_1(\theta_1)$ is a differentiable function, and the training apparatus finds the parameter $\theta_l$ that minimizes the objective function $J_1(\theta_1)$ through a backpropagation algorithm.

In addition, the training apparatus uses a reinforcement learning method to find the parameter $\theta_s$. A reward function for the parameter $\theta_s$ is defined, and the training apparatus finds the parameter $\theta_s$ that maximizes the reward function through a policy gradient method. How to find the parameter $\theta_s$ for optimization will be now described.

For example, a sequence of numbers of frames skipped while the acoustic model is processing an acoustic sequence $x_{1:T}$ divided into T frames is $s_{1:N}$, and the acoustic sequence $x_{1:T}$ is a training acoustic sequence and the sequence $s_{1:N}$ indicates a number of skip frames. In the example illustrated in FIG. 6, $s_{1:N}$ includes information of 2, 1, 4, . . . . In this example, assuming a last hidden layer used when the acoustic model predicts the number of skip frames at an i-th time is $h_i$, a last hidden layer used when predicting 2 is $h_1$, a last hidden layer used when predicting 1 is $h_2$, and a last hidden layer used when predicting 4 is $h_3$. The acoustic model predicts the number of skip frames, for example, $s_i$, by extracting a sample from a multinomial distribution $p(s_i|h_i; \theta_s)$, in which $s_i$, denotes a predicted number of skip frames at an i-th prediction and p denotes a probability value corresponding to $s_i$. A skip layer of the acoustic model outputs $p(s_i|h_i; \theta_s)$.

In one example, a correct pronunciation of the acoustic sequence $x_{1:N}$ is $y_{1:T}$, the maximum number of skip frames is M, and the number of a frame used when predicting the number of skip frames at the i-th prediction is j. When a pronunciation continues, the training apparatus trains the acoustic model to skip all frames of the continuing pronunciation, except a first frame of the continuing pronunciation, so as to skip as many frames as possible without a loss of recognition accuracy. Assume that the acoustic model is about to predict the number of skip frames at the i-th prediction while processing the j-th frame, a pronunciation corresponding to the j-th frame is $y_j$ and a length, or a duration, of the pronunciation $y_j$ starting from the j-th frame is $D(y_j)$. In such an example, the maximum number of skip frames is M, and a target number of skip frames corresponding to the i-th prediction of the number of skip frames is $s_i^*$, which is represented by Equation 1 below.

$$s_i^* = \min(D(y_j), M) \qquad (1)$$

When the number of skip frames predicted by the acoustic model is equal to the target number of skip frames, the training apparatus assigns a reward of 0 to the prediction of the number of skip frames. Otherwise, the training apparatus assigns a reward to a prediction of the number of skip frames based on a difference between the predicted number of skip frames and the target number of skip frames. A reward function $r_i$ corresponding to the i-th prediction of the number of skip frames is represented by Equation 2 below.

$$r_i = -|s_i^* - s_i| \qquad (2)$$

In Equation 2, $s_i$ denotes the predicted number of skip frames at the i-th prediction, and $s_i^*$ denotes the target number of skip frames corresponding to the i-th prediction.

To assign a higher penalty to training of the acoustic model to a more inaccurate prediction made by the acoustic model, a reward corresponding to an accurate prediction of the number of frames to be skipped is set 0, and a reward corresponding to an inaccurate prediction of the number of frames to be skipped is set a negative value, or a penalty. As the inaccuracy of a prediction made by the acoustic model during training increases, the penalty assigned to the training of the acoustic model increases, so the acoustic model is trained to make less inaccurate predictions of the number of frames to be skipped when the acoustic model is trained based on the reward function.

An objective function $J_2(\theta_s)$ used to optimize $\theta_s$ is represented by Equation 3 below.

$$J_2(\theta_s) = \mathbb{E}_{p(s_{1:N};\theta_s)}\left[\sum_{i=1}^{N} \gamma^{i-1} r_i\right] \quad (3)$$

In Equation 3, the objective function $J_2(\theta_s)$ denotes an expected reward corresponding to an N-th prediction of the number of skip frames, starting from a first prediction of the number of skip frames. $\gamma$ denotes a discount factor, and N denotes a frame, or the number of a frame, at which the number of skip frames is predicted.

In one example, the training apparatus trains the acoustic model to maximize the expected reward based on Equation 3.

A probability value $p(s_{1:N}; \theta_s)$ used to predict the number of skip frames is represented by Equation 4 below.

$$p(s_{1:N};\theta_s) = \Pi_i p(s_i|h_i;\theta_s). \quad (4)$$

The training apparatus uses a reinforcement algorithm to optimize the objective function of Equation 3, and obtains an approximate derivative of the objective function of Equation 3 represented by Equation 5 below.

$$\nabla J_2(\theta_s) = \mathbb{E}_{p(s_{1:N};\theta_s)}\sum_{i=1}^{N} [\nabla \log p(s_i \mid h_i; \theta_s) R_i] \quad (5)$$

In Equation 5, $R_i$ is represented by Equation 6 below.

$$R_i = \sum_{k=i}^{N} \gamma^{k-1} r_k \quad (6)$$

The training apparatus calculates the approximate derivative of $J_2(\theta_s)$ using a reward based on a prediction of the number of skip frames according to Equation 5. In the derivative of the objective function in Equation 5, $R_i$ denotes a reward value that applies, in addition to a current prediction of the number of skip frames, subsequent predictions of the number of skip frames. To lessen the effect on the reward of a subsequent prediction that is further from the current prediction, the discount factor $\gamma$ is applied to $R_i$. The derivative of the objective function including $R_i$ is used when the parameter $\theta_s$ is learned using a gradient descent, and thus the subsequent predictions of the number of skip frames are applied based on the discount factor $\gamma$ when training the current prediction of the number of skip frames. The training apparatus may use various methods to reduce a distribution of the approximate derivative of $J_2(\theta_s)$.

The training apparatus uses an objective function represented by Equation 7 below to train the acoustic model.

$$J(\theta_l,\theta_s) = J_1(\theta_l) + J_2(\theta_s) \quad (7)$$

In one example, a reward function is defined to skip as many frames in an acoustic sequence as possible while maintaining accuracy of speech recognition. Depending on an application of the speech recognition method, accuracy of speech recognition may be considered more important than a recognition speed, or vice versa. That is, there is an inverse relationship between the accuracy of speech recognition and the recognition speed. For example, skipping many frames in an acoustic sequence to increase the recognition speed degrades the accuracy of speech recognition because modeling a change in a speech signal cannot be accurately performed. Conversely, skipping fewer frames in an acoustic sequence to increase the accuracy of speech recognition decreases the recognition speed.

In one example, the training apparatus trains the acoustic model by determining whether to focus on the accuracy of speech recognition or the recognition speed. For example, in a case in which the acoustic model predicts a number of skip frames equal to a target number of skip frames, the reward function assigns a reward of 0 to the prediction of the number of skip frames. In another case in which a difference between the predicted number of skip frames and the target number of skip frames and the predicted number of skip frames increases, the reward function assigns a greater penalty to the prediction of the number of skip frames. In one example, the training apparatus changes the reward function to adjust the number of frames to be skipped by the acoustic model. In one example, the training apparatus applies a speed weight w to the reward function. For example, a reward function $r_i'$ in which different weights are assigned to a case in which the acoustic model predicts a number of skip frames that is less than the target number of skip frames and a case in which the acoustic model predicts a number of skip frames that is greater than the target number of skip frames is represented by Equation 8 below.

$$r_i' = A, \text{ if } s_i^* = s_i$$

$$r_i' = s_i^* - s_i, \text{ if } s_i^* < s_i$$

$$r_i' = w \times (s_i - s_i^*), \text{ if } s_i^* > s_i \quad (8)$$

In Equation 8, A is a constant greater than or equal to 0. A case in which $s_i^* < s_i$ is a case in which the acoustic model predicts a greater number of skip frames than the target number of skip frames, and thus the training apparatus assigns a penalty to the prediction of the number of skip frames as described above. Conversely, a case in which $s_i^* > s_i$ is a case in which the acoustic model predicts a fewer number of skip frames than the target number of skip frames, and thus the training apparatus increases a penalty assigned to the prediction of the fewer number of skip frames by multiplying the penalty assigned to the prediction of the greater number of skip frames by a speed weight w indicating how much more of a penalty is to be assigned to the prediction of the fewer number of skip frames than to the prediction of the greater number of skip frames.

The training apparatus determines a value of the speed weight w by determining which one of the accuracy and the recognition speed needs a relatively greater weight. For example, when w is 1.0, similar rewards are assigned to the two cases of the prediction of the greater number of skip frames than the target number of skip frames and the prediction of the fewer number of skip frames than the target number of skip frames. When w is less than 1.0, a smaller disadvantage is assigned to the prediction of the fewer number of skip frames than the target number of skip frames, and thus the acoustic model skips fewer frames and the accuracy of recognition increases. However, when w is greater than 1.0, a greater disadvantage is assigned to the prediction of the fewer number of skip frames, and thus the acoustic model skips more frames and the recognition speed increases.

Figure 7:
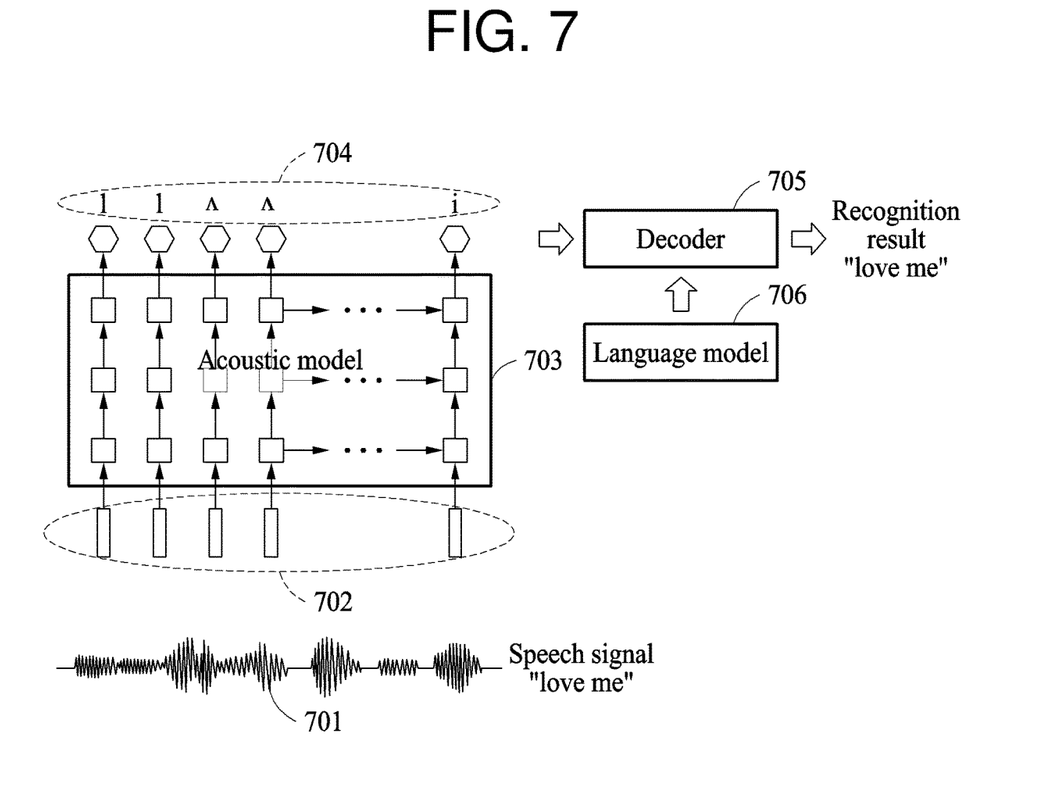
FIG. 7 is a diagram illustrating an example of a speech recognition system.

FIG. 7 is a diagram illustrating an example of a speech recognition system.

Referring to FIG. 7, a speech recognition system includes an acoustic model 703, a decoder 705, and a language model 706. The speech recognition system predicts pronunciations 704 from an acoustic sequence 702 corresponding to a speech signal 701 using the acoustic model 703 and performs speech recognition using the decoder 705 and the language model 706.

Figure 8:
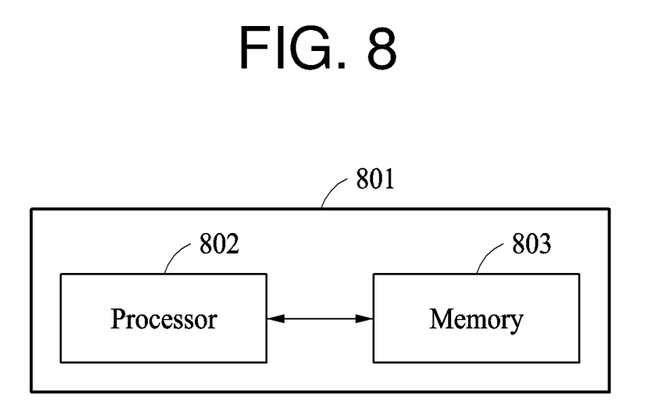
FIG. 8 is a diagram illustrating an example of an apparatus.

FIG. 8 is a diagram illustrating an example of an apparatus.

Referring to FIG. 8, an apparatus 801 includes a processor 802 and a memory 803. The apparatus 801 is either one or both of the speech recognition apparatus and the training apparatus described with reference to FIGS. 1 through 7. The processor 802 implements at least part of either one or both of the speech recognition apparatus and the training apparatus described with reference to FIGS. 1 through 7, and performs one or more operations or processes, or all of the operations or processes, performed by either one or both of the speech recognition apparatus and the training apparatus described with reference to FIGS. 1 through 7. The memory 803 stores the speech recognition method described herein or information associated with the speech recognition method, stores the training method described herein or information associated with the training method, or stores a program that implements either one or both of the speech recognition method and the training method. The memory 803 may be a volatile memory or a nonvolatile memory.

The processor 802 executes the program and controls the apparatus 801. Program code of the program executed by the processor 802 is stored in the memory 803. The apparatus 801 may be connected to an external device, for example, a PC and a network, through an input device and an output device (not shown), and may exchange data with the external device.

The speech recognition apparatus described with reference to FIGS. 1 through 3, the hidden layers 203, the label layer 204, and the skip layer 205 in FIG. 2, the hidden layers, the label layer, and the skip layer in FIG. 3, the training apparatus described with reference to FIGS. 5 and 6, the speech recognition system, the acoustic model 703, the decoder 705, and the language model 706 of FIG. 7, and the apparatus 801, the processor 802, and the memory 803 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 through 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A speech recognition method comprising:
   obtaining an acoustic sequence divided into a plurality of frames; and
   determining pronunciations in the acoustic sequence by predicting a duration of a same pronunciation in the acoustic sequence, skipping a respective pronunciation prediction for frames corresponding to the duration, and determining a respective pronunciation of the skipped frames corresponding to the duration by applying, to the respective pronunciation of the skipped frames, a pronunciation of a previous frame before the skipped frames,
   wherein the duration is represented by a number of frames for which the pronunciation prediction is to be skipped, and the number of frames skipped is dynamically determined according to a result of the determining pronunciations.

2. The speech recognition method of claim 1, wherein the determining of the pronunciations comprises:
   predicting a first pronunciation of a first frame among the frames using an acoustic model;
   predicting a first duration of the first pronunciation using the acoustic model; and
   skipping a pronunciation prediction for at least one second frame corresponding to the first duration.

3. The speech recognition method of claim 2, wherein the determining of the pronunciations further comprises determining a pronunciation of each frame of the at least one second frame to be the first pronunciation.

4. The speech recognition method of claim 2, wherein the determining of the pronunciations further comprises predicting a second pronunciation of a frame following a last frame of the at least one second frame and a duration of the second pronunciation.

5. The speech recognition method of claim 2, wherein the acoustic model comprises a neural network,
   an output layer of the neural network comprises a label layer and a skip layer,
   the label layer is configured to predict a pronunciation of an input frame input to the neural network, and
   the skip layer is configured to predict a duration of the pronunciation of the input frame.

6. The speech recognition method of claim 5, wherein the label layer comprises a number of nodes equal to a number of all possible pronunciations that can be predicted by the label layer,
   the duration is represented by a number of frames for which the pronunciation prediction is to be skipped, and
   the skip layer comprises a number of nodes equal to a number of all possible choices for a number of frames for which the pronunciation prediction is to be skipped.

7. A non-transitory computer-readable medium storing instructions that, when executed by a processor, cause the processor to perform the speech recognition method of claim 1.

8. A speech recognition method comprising:
   obtaining an acoustic sequence divided into a plurality of frames;
   predicting a first pronunciation of a first frame among the frames using an acoustic model;
   predicting a first duration of the first pronunciation using the acoustic model; and
   performing speech recognition on the acoustic sequence by skipping a pronunciation prediction for at least one frame corresponding to the first duration and determining a pronunciation of each frame of the at least one skipped frame by applying, to the pronunciation of each frame of the at least one skipped frame, the first pronunciation of the first frame,
   wherein the first duration is represented by a number of frames for which the pronunciation prediction is to be skipped, and the number of frames skipped is dynamically determined according to the first duration.

9. The speech recognition method of claim 8, wherein the performing of the speech recognition comprises predicting a second pronunciation of a frame following a last frame of the at least one frame and a duration of the second pronunciation.

10. The speech recognition method of claim 8, wherein the acoustic model comprises a neural network, an output layer of the neural network comprises a label layer and a skip layer, the label layer is configured to predict a pronunciation of an input frame input to the neural network, and the skip layer is configured to predict a duration of the pronunciation of the input frame.

11. A speech recognition apparatus comprising:

a processor configured to:

obtain an acoustic sequence divided into a plurality of frames, and determine pronunciations in the acoustic sequence by predicting a duration of a same pronunciation in the acoustic sequence, skipping a respective pronunciation prediction for frames corresponding to the duration, and determining a respective pronunciation of the skipped frames by applying, to the respective pronunciation of the skipped frames, a pronunciation of a frame before the skipped frames, wherein the duration is represented by a number of frames for which the pronunciation prediction is to be skipped, and the number of frames skipped is dynamically determined according to a result of the determining pronunciations.

12. The speech recognition apparatus of claim 11, wherein the processor is further configured to:

predict a first pronunciation of a first frame among the frames using an acoustic model, predict a first duration of the first pronunciation using the acoustic model, and skip a pronunciation prediction for at least one second frame corresponding to the first duration.

13. The speech recognition apparatus of claim 12, wherein the processor is further configured to determine a pronunciation of each frame of the at least one second frame to be the first pronunciation.

14. The speech recognition apparatus of claim 12, wherein the processor is further configured to predict a second pronunciation of a frame following a last frame of the at least one second frame and a duration of the second pronunciation.

15. The speech recognition apparatus of claim 12, wherein the acoustic model comprises a neural network, an output layer of the neural network comprises a label layer and a skip layer, the label layer is configured to predict a pronunciation of an input frame input to the neural network, and the skip layer is configured to predict a duration of the pronunciation of the input frame.

16. The speech recognition apparatus of claim 15, wherein the label layer comprises a number of nodes equal to a number of all possible pronunciations that can be predicted by the label layer, the duration is represented by a number of frames for which the pronunciation prediction is to be skipped, and the skip layer comprises a number of nodes equal to a number of all possible choices for a number of frames for which the pronunciation prediction is to be skipped.

17. A speech recognition method comprising:

receiving an acoustic sequence;

predicting a first pronunciation at a first point in the acoustic sequence;

predicting a second point in the acoustic sequence at which the first pronunciation is expected to change; and skipping a pronunciation prediction until the second point is reached, and determining the first pronunciation to continue after the first point until the second point is reached, wherein the predicting of the second point comprises predicting a first duration during which the first pronunciation is expected to continue after the first point, and the duration is dynamically determined according to the first pronunciation.

18. The speech recognition method of claim 17, wherein the skipping of the pronunciation prediction comprises skipping the pronunciation prediction for the first duration.

19. The speech recognition method of claim 17, wherein the predicting of the first pronunciation comprises predicting the first pronunciation using an acoustic model, and the predicting of the first duration comprises predicting the first duration using the acoustic model.

20. The speech recognition method of claim 19, wherein the acoustic model comprises a neural network configured to receive the acoustic sequence, the neural network comprises an output layer, the output layer comprises a label layer and a skip layer, the label layer is configured to predict a pronunciation at a point in the acoustic sequence, and the skip layer is configured to predict a duration of the pronunciation predicted at the point in the acoustic sequence.

21. The speech recognition apparatus of claim 20, wherein the label layer comprises a number of nodes equal to a number of all possible pronunciations that can be predicted by the label layer, and the skip layer comprises a number of nodes equal to a number of all possible durations that can be predicted by the skip layer.

22. The speech recognition method of claim 21, wherein the label layer is a softmax layer, a pronunciation corresponding to a node of the label layer having a greatest output value among the nodes of the label layer corresponds to the predicted pronunciation at the point in the acoustic sequence, the skip layer is a softmax layer, and a pronunciation corresponding to a node of the skip layer having a greatest output value among the nodes of the skip layer corresponds to the predicted duration of the predicted pronunciation at the point in the acoustic sequence.

23. The speech recognition method of claim 17, wherein the acoustic sequence is divided into frames, the predicting of the first pronunciation comprises predicting the first pronunciation for a first frame in the acoustic sequence, the predicting of the second point comprises predicting a number of second frames in the acoustic sequence for which the first pronunciation will continue after the first frame, and the skipping of the pronunciation prediction comprises skipping the pronunciation prediction for the number of second frames.

24. The speech recognition method of claim 23, further comprising:

assigning the first pronunciation to each of the second frames;

predicting a second pronunciation for the third frame; and predicting a number of fourth frames in the acoustic sequence for which the second pronunciation will continue after the third frame.

25. The speech recognition method of claim 23, wherein the number of second frames is greater than or equal to 0, and less than or equal to a maximum permissible number of frames for which the pronunciation prediction can be skipped.

26. The speech recognition method of claim 25, wherein the maximum permissible number of frames for which the pronunciation prediction can be skipped is set based on a desired tradeoff between an accuracy of speech recognition and a speed of speech recognition.

27. The speech recognition method of claim 26, wherein increasing the maximum permissible number of frames for which the pronunciation prediction can be skipped decreases the accuracy of speech recognition and increases the speed of speech recognition, and decreasing the maximum permissible number of frames for which the pronunciation prediction can be skipped increases the accuracy of speech recognition and decreases the speed of speech recognition.

28. The speech recognition method of claim 1, comprising determining the pronunciations in the acoustic sequence using an acoustic model, wherein the acoustic model comprises a neural network, an output layer of the neural network comprises a skip layer, and the skip layer is configured to predict a duration of a pronunciation of an input frame input to the neural network.

\* \* \* \* \*